United States Patent [19]

Lapeyre, deceased

[11] Patent Number: 4,971,191

[45] Date of Patent: Nov. 20, 1990

[54] ACCURATE TRACKING CENTER DRIVEN OPEN AREA BELT

[75] Inventor: James M. Lapeyre, deceased, late of New Orleans, La., by Noreen B. Lapeyre, Executrix

[73] Assignee: The Laitram Corporation, New Orleans, La.

[21] Appl. No.: 529,513

[22] Filed: May 29, 1990

Related U.S. Application Data

[60] Division of Ser. No. 445,916, Dec. 4, 1989, Pat. No. 4,941,568, which is a continuation of Ser. No. 105,011, Oct. 6, 1987, abandoned.

[51] Int. Cl.$^5$ .............................................. B65G 17/06
[52] U.S. Cl. .................................................. 198/853
[58] Field of Search ....................... 198/834, 851, 853

[56] References Cited

U.S. PATENT DOCUMENTS 3,602,364 8/1971 Maglio ................................. 198/853
4,941,568 7/1990 Lapeyre ............................... 198/853

Primary Examiner—Joseph E. Valenza
Attorney, Agent, or Firm—Laurence R. Brown

[57] ABSTRACT

An accurately tracking belt with a large amount of open area is disclosed. The belt is made of integrally molded plastic modules connected end-to-end and may be connected side-by-side preferably in a bricklayed fashion to form a conveyor belt. Each of the modules includes a plurality of links spaced apart by a selected distance. Each of the links themselves include an elongated member which extends between and joins first and second groups of link ends. A cross member is integrally molded with the links to maintain the links in the particular spaced relation and to maintain the pivot holes defined in the link ends of each link in alignment such that a multiplicity of the modules may be pivotally connected by pivot rods to form a belt.

30 Claims, 3 Drawing Sheets

FIG.8B
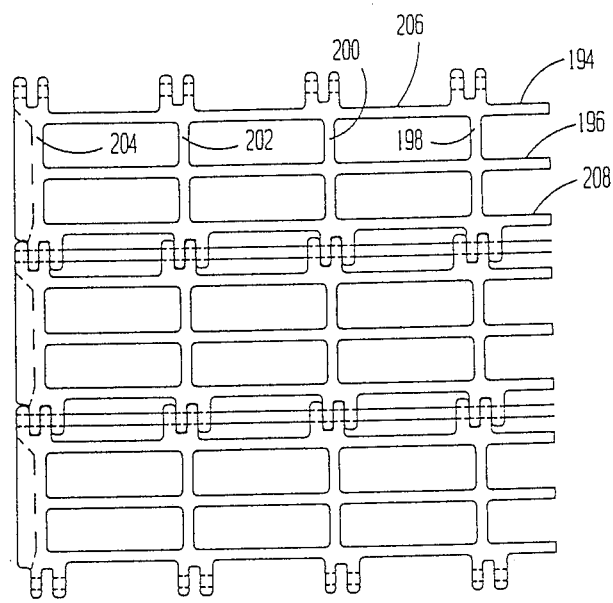
FIG.8A
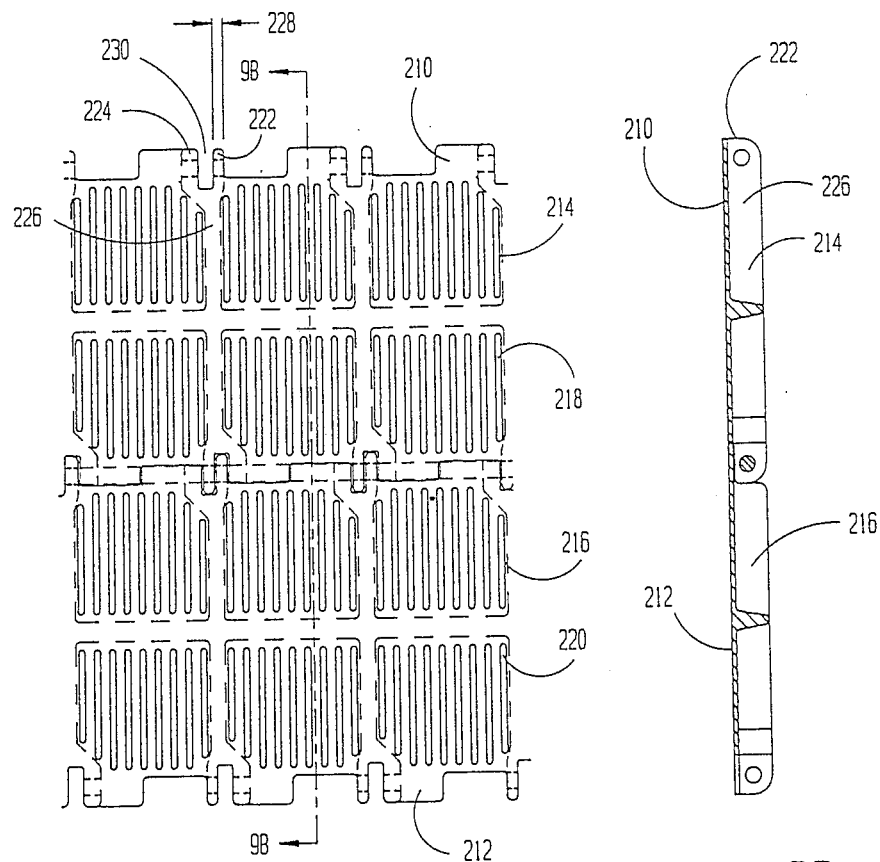
FIG.9A
FIG.9B

ACCURATE TRACKING CENTER DRIVEN OPEN AREA BELT

This application is a Division of U.S. application Ser. No. 445,916 filed Dec. 4, 1989 now U.S. Pat. No. 4,941,568 which was a continuation of U.S. application Ser. No. 105,011 filed Oct. 6, 1987 now abandoned.

TECHNICAL FIELD

This invention relates to a modular conveyor belt which accurately tracks along its path of travel, it driven at the center of the module rather than at the ends, and is formed of modules which provide an exceptionally amount of open area. The belt may be made of any length or width by connecting the necessary number of modules end-to-end and side-by-side. The end-to-end and side-by-side arrangement may of course be in bricked-layed fashion for increased strength. More specifically, the individual models are formed in a multiplicity of integrally molded and connected links, each link including an elongated member extending between link ends. Important to the invention is the use of two link ends on at least one end of the elongated member and the use of a cross-member which both integrally connects the links and provides a working surface for a drive sprocket such that each module of the belt can be center driven.

BACKGROUND OF THE INVENTION

A typical modular conveyor belt is disclosed in U.S. Pat. No. 3,870,141 issued to J. M. Lapeyre on Mar. 11, 1975. According to this patent identical modules formed by injection molding are pivotally connected to one another to form a conveyor belt of a desired length and width. Each module includes a plurality of elongated elements, each of which has a first pivot end and a second pivot end. The plurality of elongated elements are connected together such that apertures defined in each of the first and second pivot ends lie along a first and second pivot axis respectively, which pivot axis are parallel one to the other. The pivot ends of one module are intermeshed and pivotally connected by means of a pivot rod with the pivot ends of another module until an entire belt having a desired length and width is formed. Plastic belts built according to the teachings of this invention have been well received by industry and have many particular uses. The module itself is typically injection molded out of plastic by means of a simple two-piece mold which includes two "halves". One "half" typically molds the bottom portion of the module and the other "half" typically molds the top portion.

U.S. Pat. No. 4,051,949 issued on Oct. 4, 1977 also to Mr. Lapeyre is an improvement patent over the U.S. Pat. No. 3,870,141 and provides raised ribs which cooperate to form channels suitable for receiving a transfer comb such that articles can readily be introduced and/or removed from the conveyor belt. U.S. Pat. No. 4,171,045 issued on Oct. 16, 1979 also to J. M. Lapeyre recognize the need for including a conveyor surface which would not allow objects riding on the conveyor surface to slip and thereby allow the belt to pass underneath. The belt disclosed and formed by the teachings of the U.S. Pat. No. 4,171,045 is similar to that of the U.S. Pat. Nos. 3,870,141 and 4,051,949 discussed heretofore except that selected ones of the raised ribs include "dogs" which extend above the normal portion of the conveying surface to contact and push articles on the conveying surface such that the belt will not slip underneath.

In a similar manner, U.S. Pat. No. 4,213,527 issued June 22, 1980 to Lapeyre, et al, further discloses a module for forming a link conveyor belt which has ridges or flight members extending transverse to the direction of travel for preventing the conveyor belt from slipping under articles riding on the conveyor surface. A study of this patent, discloses that the particular modules are molded by an extrusion process and then the spaces between link ends are cut into place. Similarly, U.S. Pat. No. 4,170,281 issued on Oct. 9, 1979 and U.S. Pat. No. 4,080,842 issued on Mar. 28, 1978 both to Lapeyre, also show conveying belts having members extending transverse to the conveying surface for moving articles on the conveying surface along the belt such that the belt cannot slip underneath the article.

U.S. Pat. No. 4,159,763 issued on July 3, 1979 and assigned to the same assignee as the previously discussed patents is also an improvement patent over the basic U.S. Pat. No. 3,870,141. The conveyor belt taught by this patent is U.S.D.A. approved as it allows for easier inspection and cleaning of the pivot pins and link ends, and has somewhat more open area and consequently more air flow through the belt.

Still other modular link conveyor belt patent applications by Lapeyre and/or owned by the same assignee as the present invention which might be considered relevant to the present invention include: Ser. No. 483,210 entitled "LINK CHAIN BELT" filed Apr. 14, 1983; Ser. No. 179,523 entitled "MODULAR CENTER DRIVE CONVEYOR BELT" filed Aug. 19, 1980; and Ser. No. 457,482 entitled "LIGHTWEIGHT MODULAR CONVEYOR BELT" filed Jan. 12, 1983. In addition patent applications entitled "CONVEYOR BELT HAVING INSERTABLE AND SELECTABLE CONVEYING MEMBERS", "CONVEYOR BELT HAVING A HIGH FRICTION CONVEYING SURFACE", and "END-TO-END MOLDED CONVEYOR BELT MODULE" having Ser. Nos. 642,534; 642,533; and 642,535 respectively, also disclose subject matter having some similarity to the present application.

Although it is believed that the injection molded plastic belting discussed above is the most relevant prior art known to applicant, a conveyor belt disclosed in a U.S. patent issued to V. C. King on Nov. 28, 1933 and having number 1,936,764 has some visual similarity to the present invention and might be considered relevant. However, even a cursory review of this prior patent reveal significant differences from the claimed invention. In addition British patent No. 1,127,316 dated Aug. 4, 1968 discloses a wire conveyor belt with very heavy cross rods. This British patent, although showing a belt having large amounts of open area, clearly is not even as relevant to the present invention as the other patents and patent applications discussed above.

It is therefore an object of the present invention to provide a simple and inexpensive modular conveyor belt which is exceptionally light weight, and which accurately tracks along its path of travel.

SUMMARY OF THE INVENTION

Other objects and advantages will be obvious and will in part appear hereinafter, and will be accomplished by the present invention which provides an integrally molded plastic module for forming a link bricklayed conveyor belt by connecting a multiplicity of such modules end-to-end and side-by-side. The module comprises a plurality of spaced apart links. Each of the spaced apart links includes an elongated member which extends between at least one and preferably a pair of link ends on one end of the elongated member and in a preferred embodiment a pair of link ends on the other end of the elongated member. Each link end of the first and second pairs circumscribe a pivot hole such that the pivot holes in the first pair of link ends define a first pivot axis and the pivot holes in the second pair of link ends define a second pivot axis. The second pivot axis will be parallel to the first pivot axis. Preferably only one link end of each of the pair of link ends on each end of the elongated member will be dimensioned so as to allow cooperation and mating with the spacing between either pair of link ends on another elongated member. The module also includes a cross member which is integrally molded with and joins each of the plurality of spaced links to maintain each one of the plurality parallel to each other and at a selected distance such that each of the first pivot axis defined by each of the first pair of link ends are aligned and each of the second pivot axis defined by each of the second pair of link ends are also aligned. The cross member also includes a surface which is parallel to the pivot axis and which receives a driving force from a drive sprocket such that each module may be center driven. The linked conveyor belt is fabricated from a multiplicity of the modules just described which are aligned end-to-end with one link end of each of the first pair of each module meshed between the link ends of a second pair of another module such that the first and second pivot axis of the meshed pairs are in alignment. The modules are then held together by a multiplicity of pivot pins which extend through the pivot holes of the joined modules.

BRIEF DESCRIPTION OF THE DRAWINGS

The above features of the present invention will be more clearly understood from consideration of the following description in connection with the accompanying drawings in which:

FIGS. 8A and 8B show a top view and side view of one module of yet another embodiment of the present invention.

FIGS. 9A and 9B shows a top view and cross-sectional view respectively of a planar member attached to the top side of a conveyor belt incorporating the features of this invention for providing a conveying surface.

BEST MODE OF CARRYING OUT THE INVENTION

Figure 1:
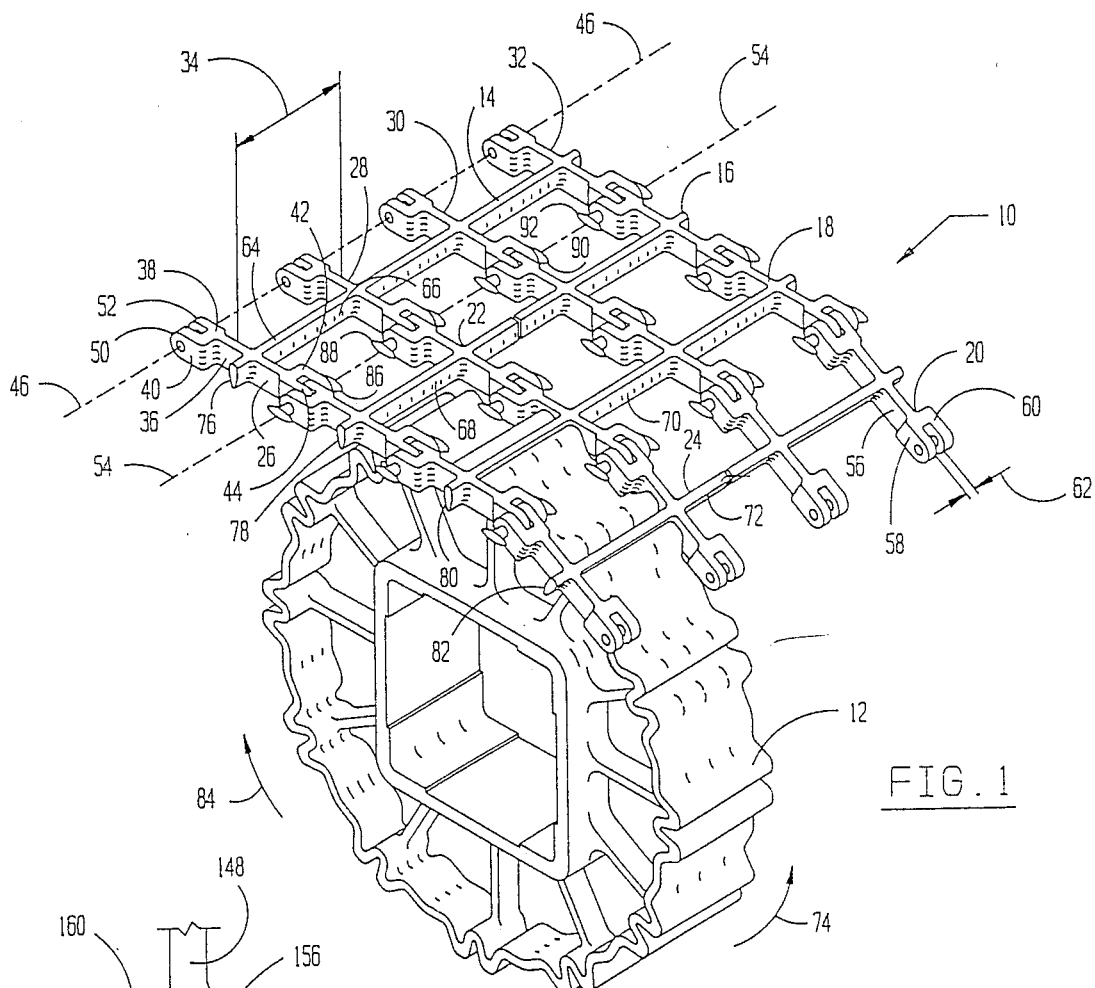
FIG. 1 is a perspective view of a conveyor belt built according to the features of this invention being driven by a drive sprocket.

Referring now to FIG. 1, there is shown generally at 10 a bricklayed open area conveyor belt engaged and being driven by a sprocket 12.

In the embodiment shown, the conveyor belt includes portions of full modules 14, 16, 18 and 20 and partial modules (shown at the left end of the picture) 22 and 24. The use of partial modules (such as modules 22 and 24) in every other row allows the belt to be assembled in a bricklayed fashion thereby resulting in a stronger belt. It will be obvious to one skilled in the art, of course, that in an operating conveyor belt a substantially larger number of modules will be connected such that an endless conveyor belt of the desired length is achieved. As is clearly shown in all the embodiments shown in FIGS. 1, 2, 5 and 6, and with specific reference to FIG. 1, each of the modules such as for example module 14 of FIG. 1 includes a plurality of links 26, 28, 30 and 32, each of which is spaced apart from an adjacent link by a selected distance such as indicated by double-headed arrow 34. Also as shown, each of the spaced links, such as link 26, includes an elongated member 36 which extends between and joins a link end 38 or a pair of link ends 38 and 40 to another pair of link ends 42 and 44. Both link ends 38 and 40 define pivot holes 50 and 52 which are aligned along a first pivot axis 46. In a similar manner, pivot ends 42 and 44 define a a pair of pivot holes (not shown) which are also aligned along a pivot axis 54 which is parallel to pivot axis 46. The link ends making up the pair of link ends at one end of the elongated member are themselves spaced apart a selected distance. For example, referring to link 56 in module 20 there is shown a similar pair of link ends 58 and 60 which are spaced apart a second distance as indicated by double-arrows labeled 62. The distance indicated by arrows 62 is clearly substantially less than the distance indicated by double-headed arrow 34. As shown, each of the modules such as modules 14 through 20 also includes an integrally molded cross member such as cross member 64 which joins each of the plurality of spaced links in the modules to maintain the links parallel to each other and at the selected distance such as the distance 34 discussed above with respect to module 14. Consequently as is clearly shown for example with respect to module 14 each of the plurality of links such as links 26 through 32 of module 14, all their pivot axis are aligned with its adjacent link. For example as is clearly seen pivot axis 46 not only extends through pivot holes 50 and 52, but also extend through the aligned pivot holes of each of the additional links in the module. In a similar manner, the pivot axis 54 not only extends through the pivot holes of link ends 42 and 44 but also extends through the pivot holes of the link ends of links 28, 30 and 32. In addition, each of the cross members such as cross member 64 includes at least one surface such as one of the surfaces 66 through 72 which is parallel to the pivot axes 46 and 54. These surfaces are suitable for receiving the application of a drive force in a particular direction such as the direction indicated by arcuate arrow 74. However, as can be seen in the embodiment of FIG. 1 the second surface of the cross members such as surfaces 76, 78, 80 and 82 are also parallel to the pivot axis and suitable for receiving a drive force in the opposite direction such as indicated by arcuate arrow 84. It is also important to understand that the cross member which includes the working surface is preferably located substantially midway between the two opposite pairs of link ends thereby resulting in a belt which is driven at the center of each module rather than at the link ends.

Figure 2:
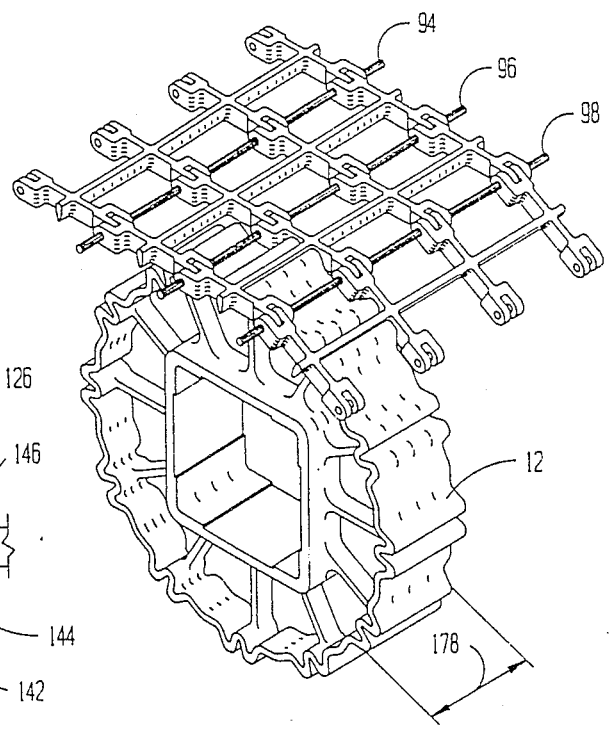
FIG. 2 shows a belt of the type illustrated in FIG. 1 wherein the pivot pins extend the width of the belt rather than use of individual pivot pins.

As can be clearly seen in FIG. 1, the individual modules 14 through 24 have their link ends aligned and meshed with the link ends of an adjacent module in an end-to-end manner. The aligned and intermeshed link ends of the end-to-end modules are then pivotally connected by a multiplicity of pivot rods extending through the pivot holes of the intermeshed link ends such as the small pivot rods 86, 88, 90 and 92. Other modules are then pivotally connected in the same manner by other pivot rods. However, it will be appreciated that although the embodiment shown in FIG. 1 shows short individual pivot rods across a module, a suitable belt may be assembled by the use of pivot rods which extend the full width of the belt such as shown by pivot rods 94, 96 and 98 of FIG. 2. It will be appreciated by one skilled in the art, that the assembly of the belt using full length pivot rods such as shown in FIG. 2 is simpler and faster than that shown in FIG. 2 since such assembly requires less steps. However a disadvantage of the full length pivot rods is the decrease in amount of open area or space. Also, in uses where a liquid, acid or cleaning bath is sprayed from under the belt a deflection of a sprayed liquid may also result.

Figure 3D:
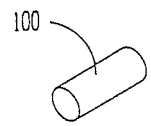
FIGS. 3A, 3B, 3C, 3D and 3E show details of one technique for providing the individual pivot pins connecting the belt shown in FIG. 1.
Figure 3E:
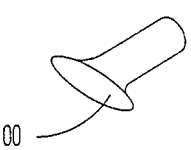
Figure 3A:
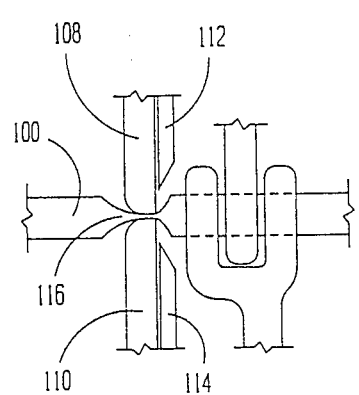
Figures 3B, 3C:
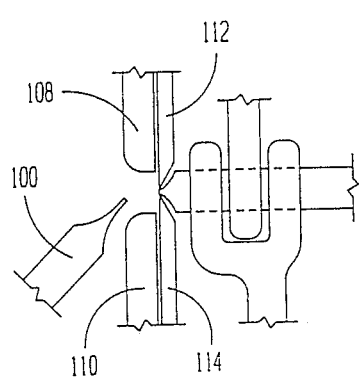

One technique for achieving both the advantages of the multiplicity of short pivot rods such as shown in FIG. 1 and the ease of assembly of the belt as achieved by the full length pivot rods as shown in FIG. 2 is discussed with respect to FIGS. 3A, 3B and 3C. Referring now to these figures, there is shown a technique for rapidly converting the belt which has been easily assembled by the use of full length pivot rods to a belt such as such in FIG. 1 using a multiplicity of individual pivot rods by deforming and removing the excess pivot rod material between the connecting link ends. As shown, in FIGS. 3A, 3B and 3C, a full length pivot rod 100 extends through a pair of link ends 102 and 104 of one link and the single link 106 of an end-to-end intermeshed adjacent link. This arrangement is similar to that shown in FIG. 5 to be discussed hereinafter. Although the embodiment illustrated in FIGS. 3A, 3B and 3C shows the single link 106 for one of the intermeshed links, it will be appreciated that link end 106 could be one of a pair of link ends such as illustrated in FIGS. 1 and 2 and the following technique would still be applicable. Once the pivot rod 100 is in place and is ready for removal, a pivot rod tool having a pair of heating and deforming plates 108 and 110 which have a heating means such that the heating and deforming plates 108 and 110 are heated to a temperature approaching that of the melting temperature of the rod material 100. In addition, the tool has a pair of cutting blades 112 and 114 which are positioned opposite each other with the pivot rod extending therebetween. When it is desired to remove a section of pivot rod, the tool is actuated such that the heating and deforming plates 108 and 110 come together and apply pressure and heat to the rod 100 until the rod is squeezed together leaving only a small neck portion 116. Once the heating and deforming plates 108 and 110 have moved towards each other to a preselected limit, the cutting blades 112 and 114 then start moving toward each other to sever the rod 100. After the cutting action of cutting blades 112 and 114 is initiated, the heated deforming plates 108 and 110 may automatically be released to spring back to the original position as the cutting blade 112 and 114 completes severing the rod 100 as is shown in FIG. 3C. FIG. 3D shows the typical cross-section of rod 100, and FIG. 3E shows the cross-section of the rod after experiencing the deformation and cutting process discussed with respect to the technique of FIGS. 3A through 3C.

Figure 4C:
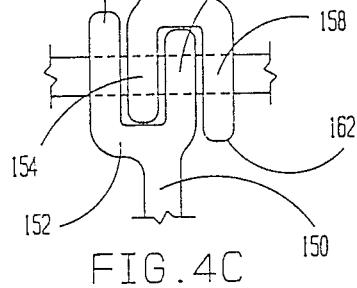
FIGS. 4A, 4B and 4C show details of three embodiments of the intermeshed link ends.
Figures 4A, 4B:
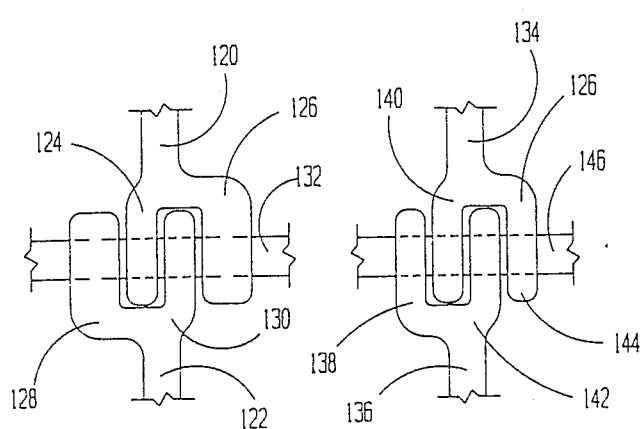

Referring now to FIGS. 4A, 4B and 4C, there are shown three different suitable embodiments of link ends for use with this invention. As shown in FIG. 4A, each link such as link 120 and 122 has a pair of link ends 124 and 126, and 128 and 130 respectively all pivotally connected by a pivot rod 132. However as is clearly seen, link end 126 of link 120 and link end 128 of link end 122 are of substantially greater thickness or width than links 124 and 130. In addition it is noted that the space between link ends 128 and 130 (or alternately 124 and 126) is smaller than the thicker link ends 126 and 128. Thus, it will be appreciated that the link ends of end-to-end aligned modules can only be intermeshed in a particular manner. This restriction on the intermeshing of the various link ends helps prevent improper assembly of the belt. Even with this arrangement, however, it will be appreciated that each module is still "end-to-end" reversible although it cannot be flipped top to bottom.

Referring now to FIG. 4B, there is shown a pair of links 134 and 136 wherein each of the link ends 138, 140, 142 and 144 are all of the same width or thickness. In addition, it can be seen that the space between link ends 138, and 142 of link 136 and the space between link ends 140 and 144 of link 134 is greater than the thicknesses of the individual link ends. Thus, the link ends may also readily be pivotally connected by pivot rods such as pivot rod 146.

As shown in FIG. 4C another embodiment includes a pair of links 148 and 150 wherein each of the link ends 152, 154, 156 and 158 are also all of the same thickness or width. Further, the spaces between each of the ends of a pair of link ends is sufficient to receive any other link end. However, it should be noted that link ends 152 and 158 each include an extension 160 and 162 respectively which prevents these link ends from being intermeshed in any manner other than that shown.

Figure 5:
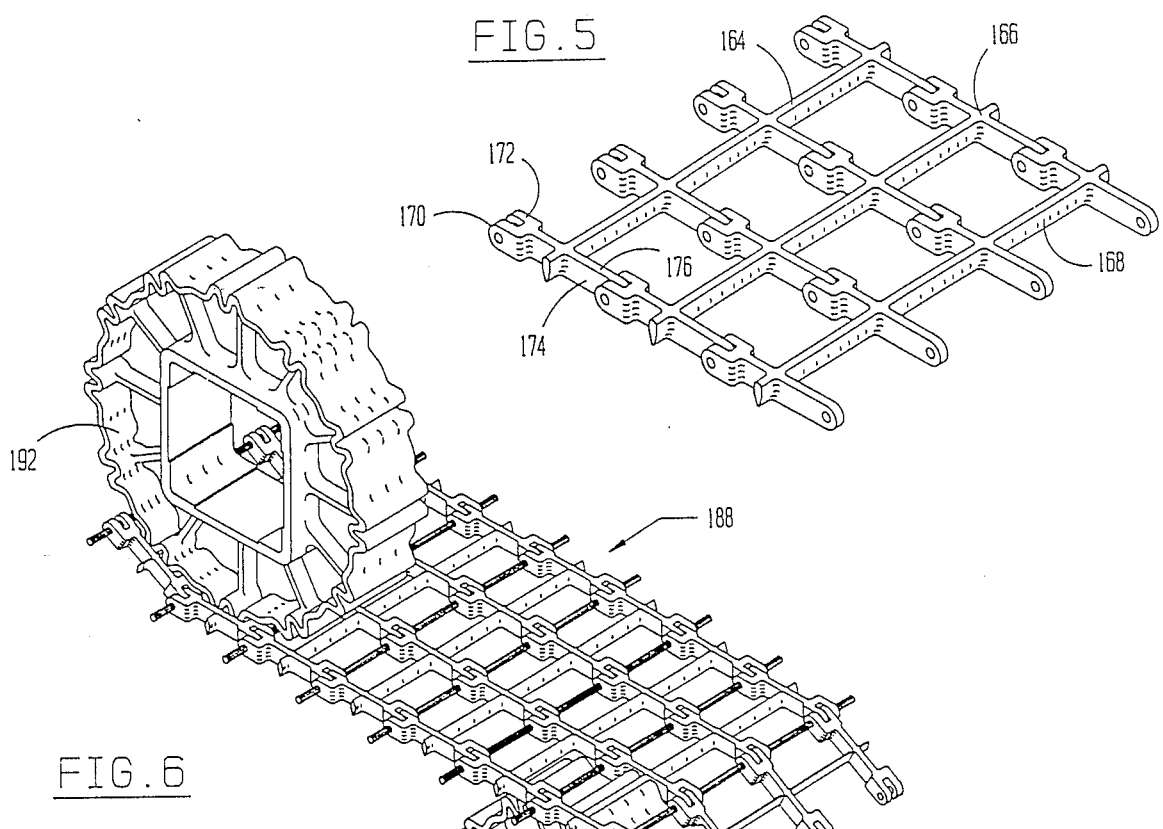
FIG. 5 shows another embodiment of link end arrangements using features of the present invention and which achieves most of the benefits of the present invention.

Still another alternate embodiment for the connection of link ends as mentioned above is illustrated more clearly in FIG. 5. As shown in FIG. 5, modules 164, 166 and 168 are shown with their ends intermeshed and aligned to form a conveyor belt. However, as shown, each module includes on one side of the module a pair of link ends at the end of each elongated member such as the pair of link ends 170 and 172 connected to link 174. However, on the other end of the elongated member 174 it is seen there is only a single link end 176. This construction also allows for easy assembly however, the individual modules are, of course, not "end-to-end" reversible. FIGS. 3A, 3B and 3C previously discussed with respect to forming a multiplicity of pivot rods from full length pivot rods shows details of the intermeshing of link ends of a type shown in FIG. 5.

The belts from pivotally connecting modules such as shown in the illustrations of FIGS. 1, 2 and 5, all are shown as having a "top and bottom" portion of the belt. Further, in each of those illustrations a drive sprocket is intermeshed with the cross members to provide the driving force. It is further noted that in each of the figures discussed heretofore the thickness of the drive sprocket such as shown by double-headed arrow 178 in FIG. 2 is shown as being of a width which is substantially the same but no greater than the length of the cross member extending between the connected links. Thus, when the sprocket is meshed with the belt for driving there can be no lateral movement between pivotally connected and adjacent link ends. This arrangement will result in accurate tracking of the belt.

Figure 6:
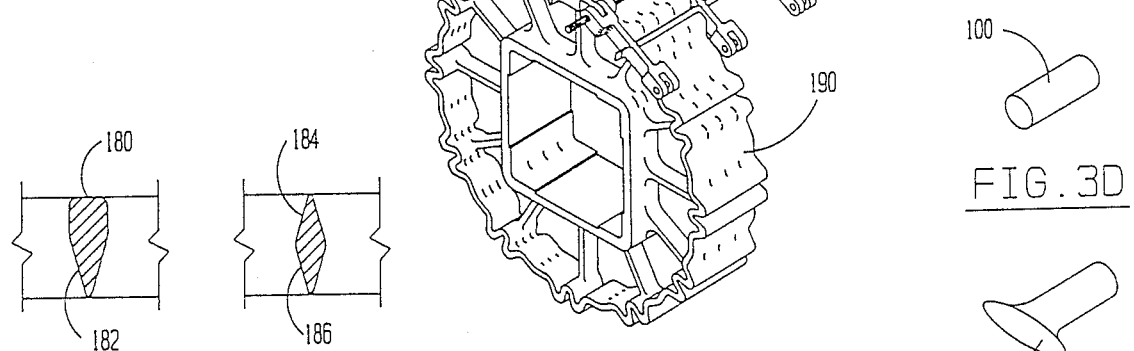
FIG. 6 shows a perspective view of still another embodiment of the present invention which can receive a drive sprocket both at the top of the belt and the bottom of the belt.
Figures 7A, 7B:
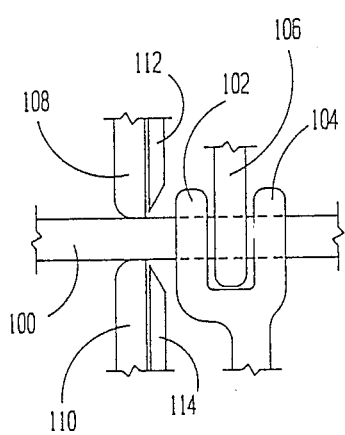
FIGS. 7A and 7B show cross-sections of the cross members connecting the links of a module shown in FIGS. 1 and 6 respectively.

The arrangement shown in FIGS. 6, is substantially similar to those shown in FIGS. 1 and 2 except for the cross-section of the cross members. As more clearly shown in FIG. 7A, the cross-section of the cross member of the modules of FIGS. 1, 2 and 5 which connects adjacent links of a module has a flat top surface 180 and a converging or substantial knife bottom edge 182. On the other hand, the cross-section of the cross member connecting links of the belt shown in FIG. 7B has a substantial knife-edge appearance at both the top and bottom as indicated by reference numbers 184 and 186 of FIG. 7B. Thus, the belt indicated generally by arrow 188 in FIG. 6 may be center driven by a sprocket meshing with the bottom of the belt such as sprocket 190 and at the same time be center driven by a belt meshing with the top of the belt as indicated by sprocket 192. As is readily understood by one skilled in the art in the preferred embodiment sprockets 190 and 192 will be similar type sprockets. Also although the illustration of FIG. 6 shows pivot rods extending the full length of the belt, it will be appreciated that individual pivot rods such as discussed in FIG. 1 and FIGS. 3A through 3C may also be used with the embodiment of FIG. 6.

Referring now to FIGS. 8A and 8B, there is shown still another embodiment of the present invention which is substantially similar to that shown in FIG. 2, but wherein each of the modules such as for example module 194 (in addition to the cross member 196 connecting the individual links 198, 200, 202 and 204) further includes additional cross members such as cross members 206 and 208 which join the adjacent links approximately at each end of the elongated member of each link. Although this arrangement or embodiment of modules does not result in as much open area as the embodiments discussed heretofore, the amount of open area is still greater than is normally available, and it will be appreciated that the module or belt will include increased lateral strength. It will further be appreciated, that the module illustrated in FIGS. 8A and 8B may also readily be driven by the same type of sprockets discussed and illustrated in FIGS. 1, 2 and 5.

FIG. 9A shows a top view and FIG. 9B shows a cross-sectional view taken along lines 9B—9B of FIG. 9A respectively of another embodiment of a conveyor belt incorporating the features of this invention. As shown in the embodiment of FIGS. 9A and 9B, perforated planar members 210 and 212 are attached to the top side of modules 214 and 216 so as to provide a conveying surface suitable for conveying very small items. In the illustrated embodiment, planar members 210 and 212 each include a multiplicity of elongated perforations, such as perforation 218 on module 214 and perforation 220 on module 216. It will be appreciated of course that the planar member 210 and 212 could be solid without perforations or alternately could include perforations of another shape. Also, in the embodiment as shown each one of the multiplicity of links making up each module includes two link ends such as link ends 222 and 224 at each end of elongated member 226. As shown, link end 222 has a width 228 which is small enough to fit in the space 230 between the two links at the end of a link. Link end 224 however, is too thick to fit in space 230. Thus, it will be appreciated that assembly of the modules is selectively controlled such as was discussed with respect to FIG. 4A. It will be appreciated of course, that planar members such as members 210 and 212 could also be attached to modules having other link end arrangements such as discussed with respect to FIGS. 4B, 4C and 5.

Thus, although there has been a described to this point particular embodiments of an accurately tracking open area type belt, it is not intended that such references and embodiments be considered as limitations upon the scope of this invention except insofar as is set forth in the following claims.

It is claimed:

1. An integrally molded plastic module suitable for forming a linked conveyor belt by pivotally connecting a multiplicity of such modules end-to-end, said module comprising:

a plurality of elongated members spaced apart a first selected distance, selected ones of said elongated members extending between and joining at least two link ends of a first group of link ends to at least two link ends of a second group of link ends, selected link ends of said first group circumscribing a pivot hole aligned along a first pivot axis, and selected link ends of said second group circumscribing a pivot hole aligned along a second pivot axis parallel to said first pivot axis, said first and second pivot axes defining a common plane therebetween, said at least two link ends of each group spaced apart a second selected distance which is less than said first selected distance, one of said two link ends of said first group having a width greater than said second selected distance such that intermeshing of link ends of said first group with said second group is selectively limited, and said plurality of elongated members being resistant to bending in a direction so as to maintain said common plane between said first and second pivot axis; and cross members integrally molded with and joining said plurality of spaced links to maintain each one of said plurality parallel to each other and spaced at said first selected distance, said cross member and said plurality of links defining a first side and a second side.

2. A linked conveyor belt fabricated from a multiplicity of modules having first and second groups of link ends such that said multiplicity of modules are suitable for intermeshing and being connected with pivot pins so that said connected groups of link ends pivot with respect to each other, said conveyor belt comprising:

a multiplicity of modules, at least some of said modules being integrally molded and including, a plurality of links spaced apart a first selected distance, said spaced links including an elongated member extending between and joining at least two link ends of said first group of link ends to at least two link ends of said second group of link ends, selected link ends of said first group circumscribing a pivot hole aligned along a first pivot axis, and selected link ends of said second group circumscribing a pivot hole aligned along a second pivot axis parallel to said first pivot axis, said first and second pivot axes defining a common plane therebetween, said at least two link ends of each group spaced apart a second selected distance, said second selected distance being less than said first selected distance, one of said two link ends of said first group having a width greater than said second selected distance such that intermeshing of link ends of said first group with said second group is selectively limited, and said elongated members being resistant to bending in a direction so as to maintain said common plane between said first and second pivot axis;

cross members integrally molded with and joining said plurality of spaced links to maintain each one of said plurality parallel to each other and spaced at said first selected distance, said cross member and said plurality of links defining a first side and a second side;

said first group of link ends of modules of said multiplicity intermeshed with said second group of link ends of other modules of said multiplicity such that said first and second pivot axis of such intermeshed modules are in alignment; and a multiplicity of pivot pins extending through said aligned pivot holes of said intermeshed modules.

3. Conveyor apparatus comprising:

a linked conveyor belt formed from a multiplicity of modules and pivot pins, each module of said multiplicity having first and second groups of link ends, and the first group of link ends of each module intermeshed and connected by one of said pivot pins with the second group of link ends of another module of said multiplicity so as to pivot with respect to each other, at lest some modules of said multiplicity being integrally molded and including a plurality of links spaced part a first selected distance, said spaced links including an elongated member extending between and joining at least two link ends of said first group to at least two link ends of said second group, selected link ends of said first group circumscribing a pivot hole aligned along a first pivot axis, and selected link ends of said second group of link ends circumscribing a pivot hole aligned along a second pivot axis parallel to said first pivot axis, said first and second pivot axis defining a common plane therebetween, said at least two link ends of each group spaced apart a second selected distance, said second selected distance being less than said first selected distance, one of said two link ends of said first group having a width greater than said second selected distance such that intermeshing of link ends of said first group with said second group is selectively limited, and said elongated members being resistant to bending in a direction for maintaining said common plane between said first and second pivot axis, cross members integrally molded with and joining said plurality of spaced links to maintain each one of said plurality parallel to each other and spaced at said first selected distance, selected ones of said at least some modules including a driving surface suitable for receiving a driving force applied in a first direction and perpendicular to said pivot axis; and a sprocket for rotating around a drive axis, said sprocket defining a plurality of driving areas located around the perimeter of said sprocket, said driving areas suitable for cooperating with said drive surface on said selected modules and for applying said drive force in said first direction.

4. An integrally molded plastic module suitable for forming a linked conveyor belt by pivotally connecting a multiplicity of such modules end-to-end, said module comprising:

a plurality of elongated members spaced apart a selected distance, selected ones of said elongated members extending between and joining at least two link ends of a first group of link ends to at least two link ends of a second group of link ends, one of said at least two link ends of said first group having a first width and the other one of said at least two link ends of said first group having a second width and selected link ends of said first group circumscribing a pivot hole aligned along a first pivot axis, one of said at least two link ends of said second group having a third width and the other of said at least two link ends of said second group having a fourth width and selected link ends of said second group circumscribing a pivot hole aligned along a second pivot axis parallel to said first pivot axis, said first and second pivot axes defining a common plane therebetween, said at least two link ends of said first group spaced apart a distance sufficient to receive said link end of said second group having said third width, and said at least two link ends of said second group spaced apart a distance sufficient to receive said link end of said first group having said first width, said distance between said at least two link ends of both of said first and second groups being less than said selected distance separating said elongated members, and said elongated members being resistant to bending in a direction so as to maintain said common plane between said first and second pivot axis; and cross members integrally molded with and joining said plurality of spaced links to maintain each one of said plurality parallel to each other and spaced at said first selected distance, said cross members and said plurality of links defining a first side and a second side.

5. A linked conveyor belt fabricated from a multiplicity of modules having first and second groups of link ends such that said multiplicity of modules are suitable for intermeshing and being connected with pivot pins such that said connected groups of link ends pivot with respect to each other, said conveyor belt comprising:

a multiplicity of modules, at least some of said modules being integrally molded and including, a plurality of links spaced apart a selected distance, selected ones of said spaced links including an elongated member extending between and joining at least two link ends of a first group of link ends to at lest two link ends of a second group of link ends, one of said at least two link ends of said first group having a first width and the other one of said at least two link ends of said first group having a second width and selected link ends of said first group circumscribing a pivot hole aligned along a first pivot axis, one of said at least two link ends of said second group having a third width and the other of said at least two link ends of said second group having a fourth width and selected link ends of said second group circumscribing a pivot hole aligned along a second pivot axis parallel to said first pivot axis, said first and second pivot axes defining a common plane therebetween, said at least two link ends of said first group spaced apart a distance sufficient to receive said link end of said second group having said third width, and said at least two link ends of said second group spaced a distance sufficient to receive said link ends of said first group having said first width, said distance between said at least two link ends of both said first and second groups being less than said selected distance separating said spaced links, and said elongated members being resistant to bending in a direction so as to maintain said common plane between said first and second pivot axis;

cross members integrally molded with and joining said plurality of spaced links to maintain each one of said plurality parallel to each other and spaced at said selected distance, said cross member and said plurality of links defining a first side and a second side;

said first group of link ends of modules of said multiplicity intermeshed with said second group of link ends of other modules of said multiplicity such that said first and second pivot axis of such intermeshed modules are in alignment; and a multiplicity of pivot pins extending through said aligned pivot holes of said intermeshed modules.

6. Conveyor apparatus comprising:

a linked conveyor belt formed from a multiplicity of modules and pivot pins, each module of said multiplicity having first and second groups of link ends, and the first group of link ends of each module intermeshed and connected by one of said pivot pins with the second group of link ends of another module of said multiplicity so as to pivot with respect to each other, at least some modules of said multiplicity being integrally molded and including a plurality of links spaced apart a selected distance, said spaced links including an elongated member extending between and joining at least two link ends of said first group to at least two link ends of said second group, one of said at least two link ends of said first group having a first width and the other one of said at least two link ends of said first group having a second width and selected link ends of said first group circumscribing a pivot hole aligned along a first pivot axis, one of said at least two link ends of said second group having a third width and the other one of said at least two link ends of said second group having a fourth width and selected link ends of said second group circumscribing a pivot hole aligned along a second pivot axis parallel to said first pivot axis, said first and second pivot axis defining a common plane therebetween, said at least two link ends of said first group spaced apart a distance sufficient to receive said link end of said second group having said third width, and said at least two link ends of said second group spaced a distance sufficient to receive said link end of said first group having said first width, said distance between said at least two link ends of both said first and second groups being less than said selected distance separating said spaced links, and said elongated members being resistant to bending in a direction for maintaining said common plane between said first and second pivot axis, cross members integrally molded with and joining said plurality of spaced links to maintain each one of said plurality parallel to each other and spaced at said selected distance, selected ones of said at least some modules including a drive surface suitable for receiving a driving force applied in a first direction and perpendicular to said pivot axis; and a sprocket for rotating around a drive axis, said sprocket defining a plurality of driving areas located around the perimeter of said sprocket, said driving areas suitable for cooperating with said drive surface on said selected modules and for applying said drive force in said first direction.

7. The module of claims 1 or 4 wherein at least one of said cross members includes a first surface parallel to said pivot axis for receiving a driving force applied in a first direction.

8. The module of claims 1 or 4, wherein each link of said plurality of links includes only a single elongated member, no more than two link ends in said first group of link ends and no more than two link ends in said second group of link ends.

9. The module of claims 1 or 4, wherein the cross-section of said cross members is symmetrical such that either of said first and second sides may operate as a driven side.

10. The module of claims 1 or 4, and further including a planar member molded to said first side to provide a conveying surface.

11. The module of claims 1 or 4, wherein said cross members join each of said plurality of spaced links substantially at their midpoint to provide a center driven module.

12. The module of claims 1 or 4, wherein said cross members include a second surface parallel to said pivot axis for applying a drive force in a second direction which is opposite said first direction.

13. The module of claims 1 or 4, wherein the cross-section of said cross members includes a flat portion of said first side such that said first side is a conveying side and said second side is a driven side.

14. The module of claim 1, wherein one of said link ends of both of said first and second groups have a width greater than said second selected distance.

15. The module of claim 4, wherein said first width of said link end of said first group is substantially the same as said third width of said link end of said second group, said second width of said link end of said first group is substantially the same as said fourth width of link end of said second group, said second and fourth widths being greater than said first and third widths and also greater than said selected distance separating said spaced links.

16. The conveyor belt of claims 2 or 5, wherein a single one of said multiplicity of pivot pins is used along each of said pivot axis.

17. The conveyor belt of claims 2 or 5, wherein at least two of said multiplicity of pivot pins are used along each of said pivot axis.

18. The conveyor belt of claims 2 or 5, wherein at least one cross member of each of said integrally molded modules includes a first surface parallel to said pivot axis for applying a drive force in a first direction.

19. The conveyor belt of claim 18, wherein at least one cross member of each of said multiplicity of modules includes a second surface parallel to said pivot axis for applying a drive force in a second direction which is opposite said first direction.

20. The conveyor belt of claims 2 or 5, wherein some of said modules of said multiplicity are aligned side-by-side in bricklayed fashion to form a conveyor belt having a width greater than the width of a single module.

21. The conveyor belt of claims 2 or 5, wherein one of said link ends of both of said first and second group have a width greater than said second selected distance.

22. The conveyor belt of claims 2 or 5, wherein said first and third widths are substantially the same, said second and fourth widths are substantially the same, said second and fourth widths are greater than said first and third widths, and said second and fourth widths are also greater than said selected distance separating said spaced links.

23. The conveyor apparatus of claims 3 or 6, wherein at least one cross member of each said integrally molded modules includes a first surface parallel to said pivot axis for applying a drive force in a first direction.

24. The conveyor apparatus of claim 23, wherein at least one cross member of each of said integrally molded modules includes a second surface parallel to said pivot axis suitable for receiving a driving force applied in a second direction which is opposite said first direction.

25. The conveyor apparatus of claim 23, wherein said driving force is applied to selected ones of said cross members of said integrally molded modules.

26. The conveyor apparatus of claim 23, wherein said driving surfaces located around the perimeter of said sprocket have a shape suitable for cooperating and meshing with both of said first and second surfaces on said cross member.

27. The conveyor apparatus of claims 3 or 6, wherein the width of said perimeter of said sprocket is no greater than said first selected distance.

28. The conveyor apparatus of claims 3 or 6, wherein said multiplicity of modules are further aligned side-by-side in bricklayed fashion to form a conveyor belt having a width greater than the width of a single module.

29. The conveyor apparatus of claim 3, wherein one of said link ends of both of said first and second groups have a width greater than said second selected distance.

30. The conveyor apparatus of claim 6, wherein said first and third widths are substantially the same, said second and fourth widths are substantially the same, said second and fourth widths are greater than said first and third widths, and said second and fourth widths are also greater than said selected distance separating said spaced links.

* * * * *